United States Patent
Tsao et al.

(10) Patent No.: US 8,059,234 B2
(45) Date of Patent: Nov. 15, 2011

(54) COLOR FILTER AND BLACK MATRIX THEREOF

(75) Inventors: Chun-Chieh Tsao, Hsinchu (TW); Hsiang-Lin Lin, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 969 days.

(21) Appl. No.: 12/017,176

(22) Filed: Jan. 21, 2008

(65) Prior Publication Data

US 2008/0231778 A1    Sep. 25, 2008

(30) Foreign Application Priority Data

Mar. 19, 2007 (TW) .................. 96109303 A (51) Int. Cl.
*G02F 1/1335* (2006.01)
(52) U.S. Cl. ...................................... 349/106
(58) Field of Classification Search ............ None
See application file for complete search history.

(56) References Cited

U.S. PATENT DOCUMENTS

| | | | |
|---|---|---|---|
| 6,143,450 A | 11/2000 | Sobue et al. | |
| 7,057,695 B2 | 6/2006 | Mun et al. | |
| 7,639,337 B2 | 12/2009 | Mun et al. | |
| 7,830,492 B2 | 11/2010 | Mun et al. | |
| 7,843,542 B2 | 11/2010 | Mun et al. | |
| 2001/0007733 A1 | 7/2001 | Matsuyama et al. | |
| 2002/0033927 A1 | 3/2002 | Mun et al. | |
| 2004/0009303 A1 | 1/2004 | Ito et al. | |
| 2006/0008713 A1 | 1/2006 | Toyoda | |
| 2008/0030658 A1 | 2/2008 | Matsuhita | |
| 2008/0284964 A1 | 11/2008 | Mun et al. | |
| 2009/0128725 A1 | 5/2009 | Mun et al. | |
| 2010/0053485 A1 | 3/2010 | Mun et al. | |
| 2011/0037933 A1 | 2/2011 | Mun et al. | |

FOREIGN PATENT DOCUMENTS

| | | |
|---|---|---|
| CN | 1719289 | 1/2006 |
| JP | 10-48417 | 2/1998 |
| JP | 2006-010883 | 1/2006 |
| JP | 2006-30650 | 2/2006 |
| TW | 573190 | 1/2004 |
| TW | 200628938 | 8/2006 |

OTHER PUBLICATIONS

English language translation of abstract of JP 2006-010883.
Taiwan Office Action mailed Jun. 2, 2011.
Machine translations of portions of JP 10-48417, TW 573190 and TW 200628938.

*Primary Examiner* — Timothy L Rude
(74) *Attorney, Agent, or Firm* — Thomas, Kayden, Horstemeyer & Risley, LLP (57) ABSTRACT

A color filter and a black matrix thereof are provided. The black matrix disposed on the substrate comprises a frame that defines a pixel area for accommodating color filter inks when performing the ink-jet process, and a spacer disposed in each of the pixels for preventing inks from overflowing to adjacent pixel areas and improving the flatness of the formed color filter layer.

22 Claims, 7 Drawing Sheets

COLOR FILTER AND BLACK MATRIX THEREOF

This application claims the benefits of the priority based on Taiwan Patent Application No. 096109303 filed on Mar. 19, 2007; the disclosure of which is incorporated by reference herein in its entirety.

CROSS-REFERENCES TO RELATED APPLICATIONS

Not applicable.

BACKGROUND OF THE INVENTION

1. Field of the Invention

The present invention relates to a color filter for use in a liquid crystal display (LCD). In particular, the present invention relates to the formation of a color filter using a novel black matrix design thereof that can improve the light filtering performance of the pixel.

2. Descriptions of the Related Art

LCDs have replaced conventional displays and have become mainstream products due to their low power consumption, light weight, low radiation and portability. In general, a LCD comprises main components including the backlight module, the liquid crystal panel, and the color filter. Among these main components, the color filter is a key component to filter the backlight source into red, green, and blue through every arranged pixel.

In a conventional manufacturing of color filters, a black matrix comprising a plurality of frame structures in correspondence to a plurality of pixel areas is first formed on a substrate to accommodate the color filter layers that prevent light leakage and undesired color mixing between adjacent pixels. The black matrix generally consisting of photosensitive materials is photolithographically formed and cured by baking or ultraviolet light exposure to strengthen these bank-like frames.

Figure 1:
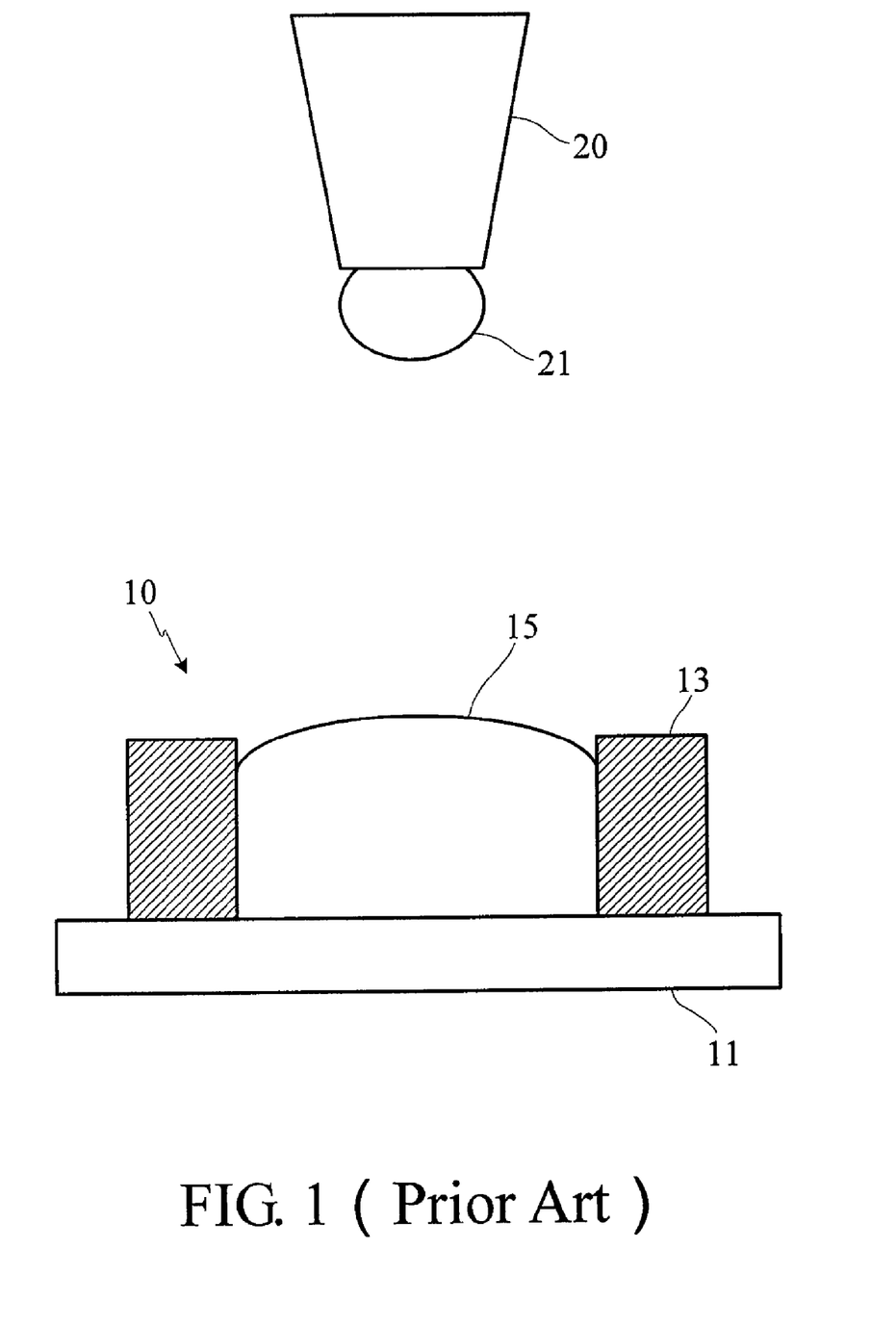
FIG. 1 is a schematic view illustrating a color filter layer being partially formed in the prior art.

FIG. 1 is a schematic side view partially illustrating the color filter 10 on a single pixel, and showing the conventional ink-jet printing (IJP) process. Specifically, after a plurality of frames 13 are formed on the substrate 11, ink 21 can be jetted into each frame 13 to form a color filter layer 15 with a specific color. After that, a baking process is followed to take on its final shape. When the light passes through the color filter layer 10, the specific color will be shown in each pixel. The combination of all pixels can be well arranged to provide chromatic variety for the use of LCD.

However, there exist some difficulties in the ink-jet color filter manufacturing process. For example, when ink 21 is jetted to the substrate 11 through a nozzle 20 with a high speed, the ink 21 probably flows over the frame 13, leading to a color mixing problem.

Figure 2:
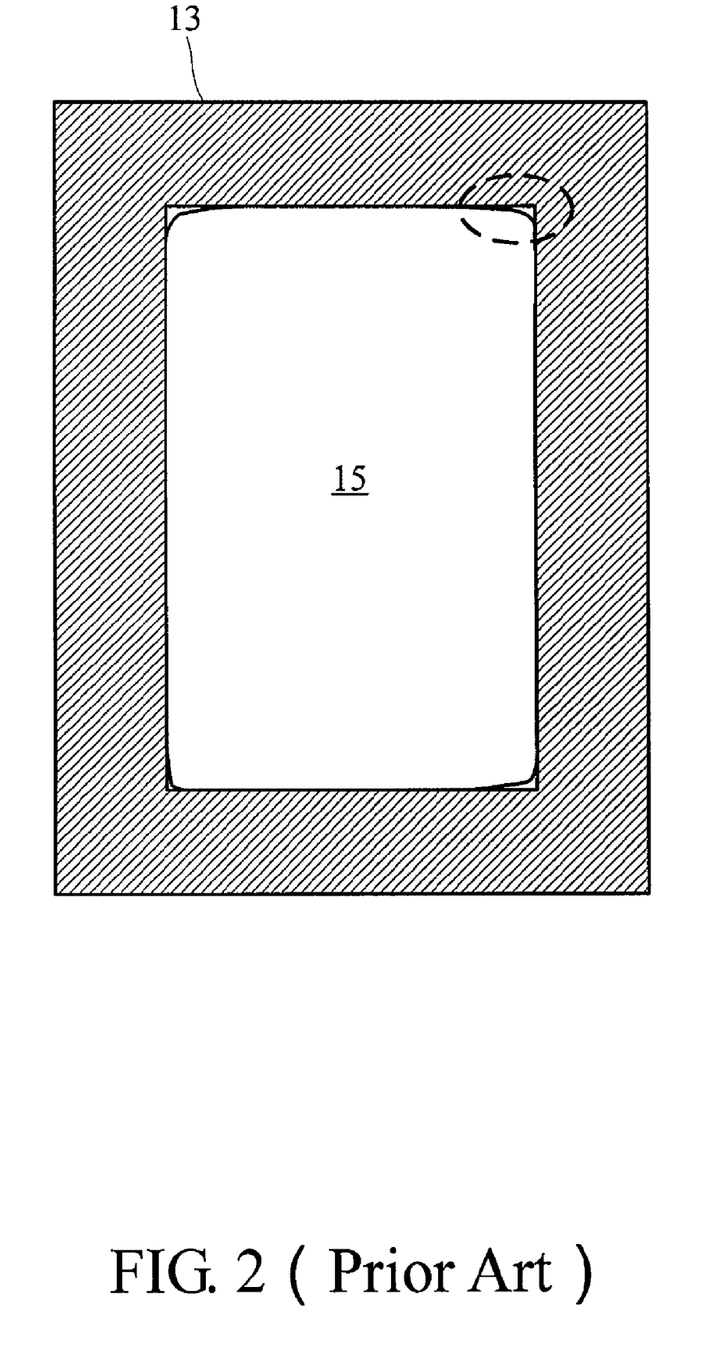
FIG. 2 is a top view of the color filter as shown in FIG. 1.

Furthermore, due to the surface tension of jetted ink in a frame 13, the formed color filter layer 15 becomes uneven that the surface contour is higher at the pixel center and even higher than the frame 13. This color filter is thus no longer flat after the baking process that will influence the step coverage of the subsequent deposition or coating processes. As shown by the dashed lines in FIG. 2, specifically, the higher surface tension at the center of a pixel 15 causes not only the uneven issue, but also the insufficient filling in four corners of the pixel resulting to light leakage. The display quality is therefore degraded, especially at the corners along the minor sides in the rectangular frame structure.

Therefore, a novel design of a color filter and a black matrix thereof is proposed to improve above-mentioned issues for the ink-jet color filter applications.

SUMMARY OF THE INVENTION

The primary objective of this invention is to provide a color filter and a black matrix thereof. By disposing a plurality of spacers, or called spacer structures, the color filter layer can obtain a relatively flat surface curvature as compared to that in the prior art because of reduction of the cohesion of the centric surface tension. Furthermore, the said spacers can be formed with the same manufacturing process of black matrix which can have substantially the same height as the frames of the black matrix. Additionally, various height and shapes of these spacers can be schemed using other photosensitive materials that may need any extra process. As a pixel is divided by more spacers, the deviation of the color filter height inside a pixel area will be eased theoretically, and the overall flatness of the ink-jetted color filter layer can be improved.

Another objective of this invention is to provide a color filter and a black matrix thereof. In the general ink-jet color filter process, the necessary numbers of ink droplets are jetted on the substrate surface with very high speed. In the case of a rectangular shaped pixel, high-speeded ink droplets probably flow over top of the black matrix frame. By disposing these spacers in a pixel, the jetted droplets can be buffered to a slower speed that bank inks in a same pixel. As a result, ink does not overflow.

A further objective of this invention is to provide a color filter and a black matrix thereof. By providing a hydrophobic surface on the black matrix and a hydrophilic surface on the substrate, the color filter inks can be uniformly distributed in the frame of the black matrix in order to improve light leakage in four corners of a pixel.

To achieve the above-mentioned objectives, this invention discloses a color filter, comprising a substrate and at least one frame. The frame is disposed on the substrate in correspondence to one of the pixel areas to define a receiving space with the substrate. At least one spacer and one color filter layer corresponding to the frame of each pixel area can be disposed in this receiving space to form a black matrix of the color filter.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 3:
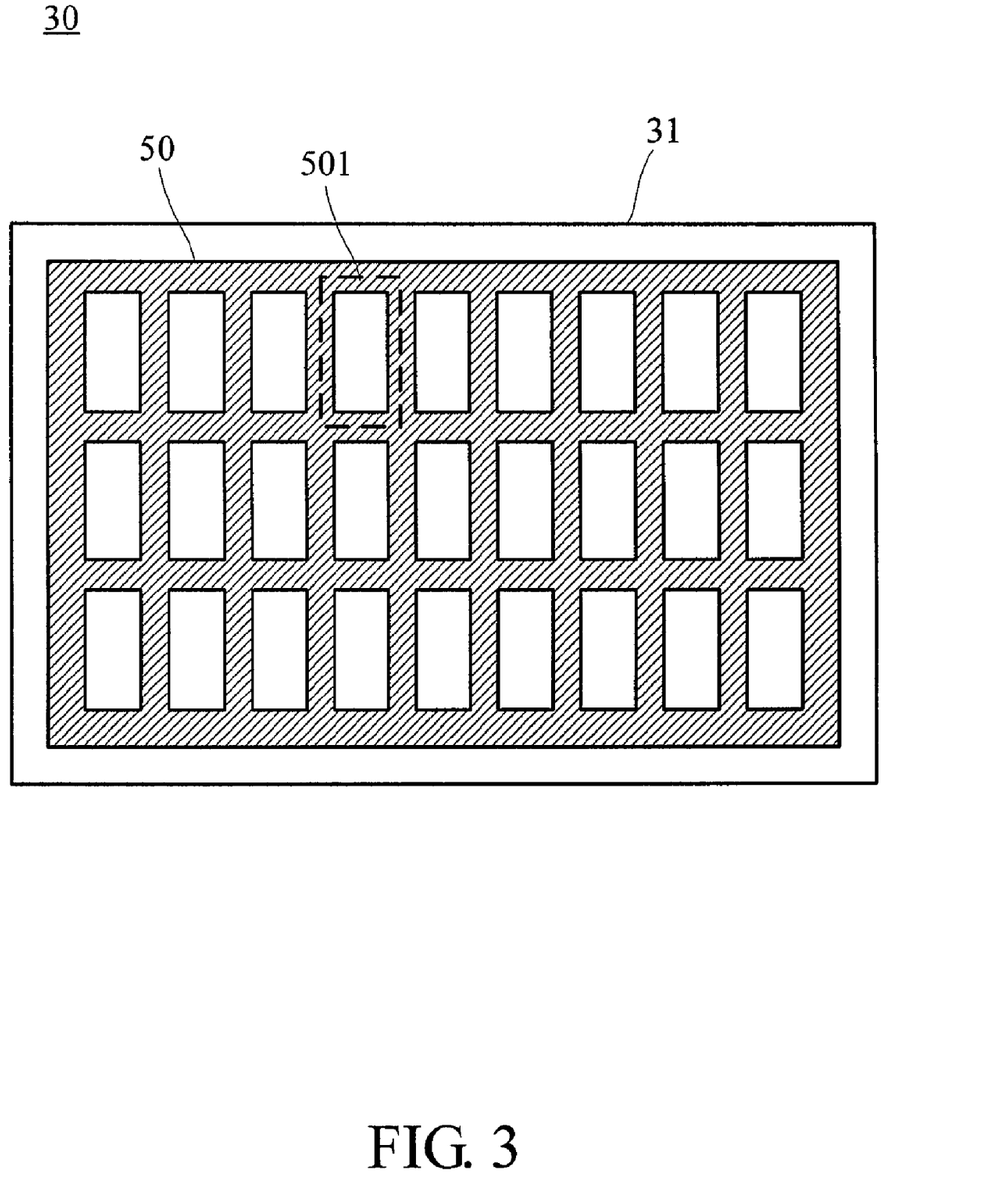
FIG. 3 is a schematic view of the color filter of the present invention.

FIG. 3 is a schematic view of a color filter 30 of the present invention. The color filter 30 comprises a substrate 31, which can be divided into a plurality of pixel areas, and a black matrix 50, which can be divided into a plurality of black matrix units 501 that correspond to the pixel areas, respectively.

Figure 4:
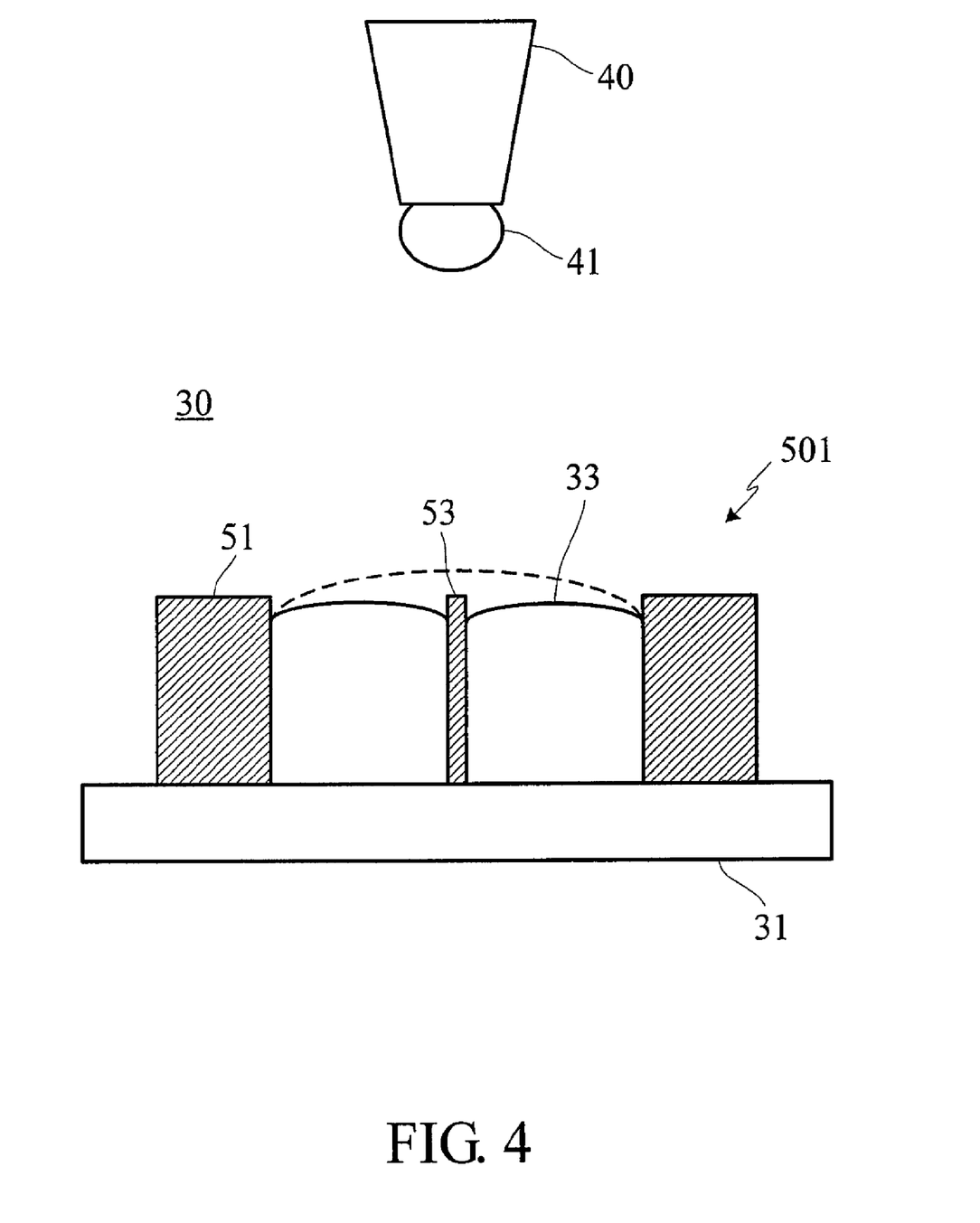
FIG. 4 is a schematic view illustrating a color filter layer being partially formed in accordance with the preferred embodiment of the present invention.
Figure 5:
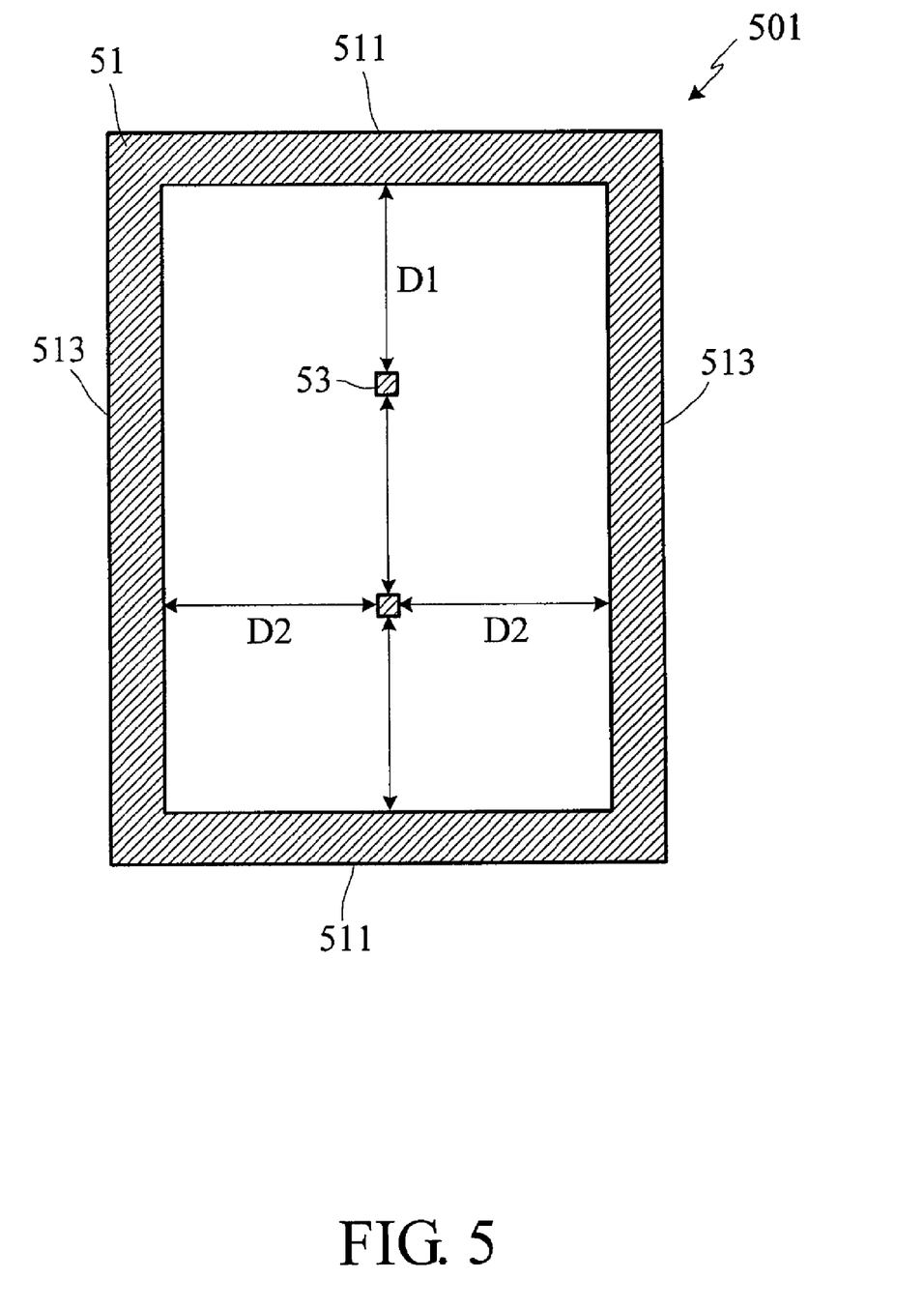
FIG. 5 is a top view of the structure as shown in FIG. 4.

FIG. 4 and FIG. 5 illustrate a side-view and a top-view of a single color filter pixel of the present invention, respectively. Each of the black matrix units 501 comprises a frame 51 and at least one spacer 53 that can be formed using the same manufacturing process as the frame 51. Specifically, the frame 51 is disposed on the substrate 31 that surrounds a single pixel area that the frame 51 and the substrate 31 define a space for accommodating ink-jetted color filter inks for a subsequent color filter layer and one or more than one of this spacer 53 are disposed in this space. The top surface of the spacer 53 should obtain an equivalent height to that of the top surface of the frame 51. In most cases of the ink-jet manufacturing process, a color filter layer 33 is formed by jetting colorant ink 41 into the receiving space through a nozzle 40, followed by a baking process. The color filter layer 33 is typically made of red, blue, or green ink, or other primary color ink.

In FIG. 5, the frame 51 basically comprises two parallel first side-walls 511 and two parallel second side-walls 513 to define the above-mentioned receiving space. In addition, the spacer 53 is preferably shaped into a column. This column may have a square, circular, triangular, or polygonal cross-section, but is not limited thereto. The number of spacers 53 can be adjusted as needed, i.e., the color filter can have a plurality of spacers 53.

FIG. 5 shows a preferred embodiment of the present invention. A plurality of spacers 53 are equidistantly arranged along the symmetric center of the pixel with respect to two first side-walls 511. In particular, a portion of the spacers 53 are linearly arranged with an equidistance D1 with respect to the closer one of side-walls 511 and keep an equidistance D2 with respect to both of side-walls 513. The dashed lines in FIG. 4 illustrates the surface tension that results to an uneven color filter layer in the prior art. In the present invention, since a whole color filter pixel area 33 is divided into a number of small areas due to the arrangement of spacers 53, the cohesion of surface tension effects more gentle surface curvature in each small area (as shown by the solid lines). Therefore, the height deviation of each color filter layer 33 is also effectively decreased, so that the overall flatness of the color filter layer 33 can be improved.

Figure 6:
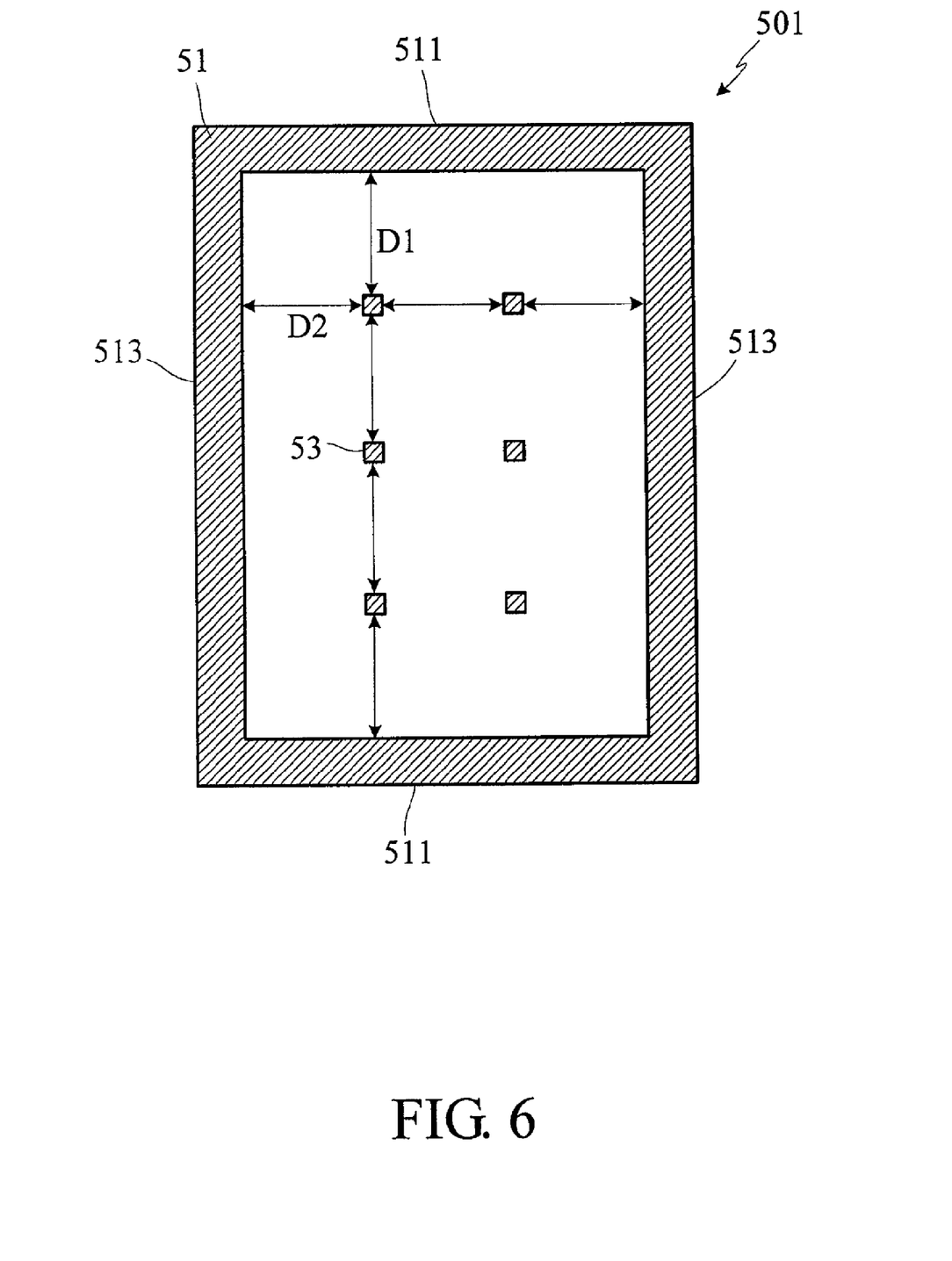
FIG. 6 is a schematic view illustrating another embodiment as shown in FIG. 5.

The spacers 53 can be arranged in various patterns. FIG. 6 shows another preferred embodiment of the present invention, in which a portion of the spacers 53 are arranged in a first linearity with a first distance D1 with respect to side-walls 511 and simultaneously, a portion of the spacers 53 are arranged in a second linearity with a second distance D2 with respect to side-walls 513. Preferably, the first distance D1 can be substantially equal to the second distance D2.

Figure 7:
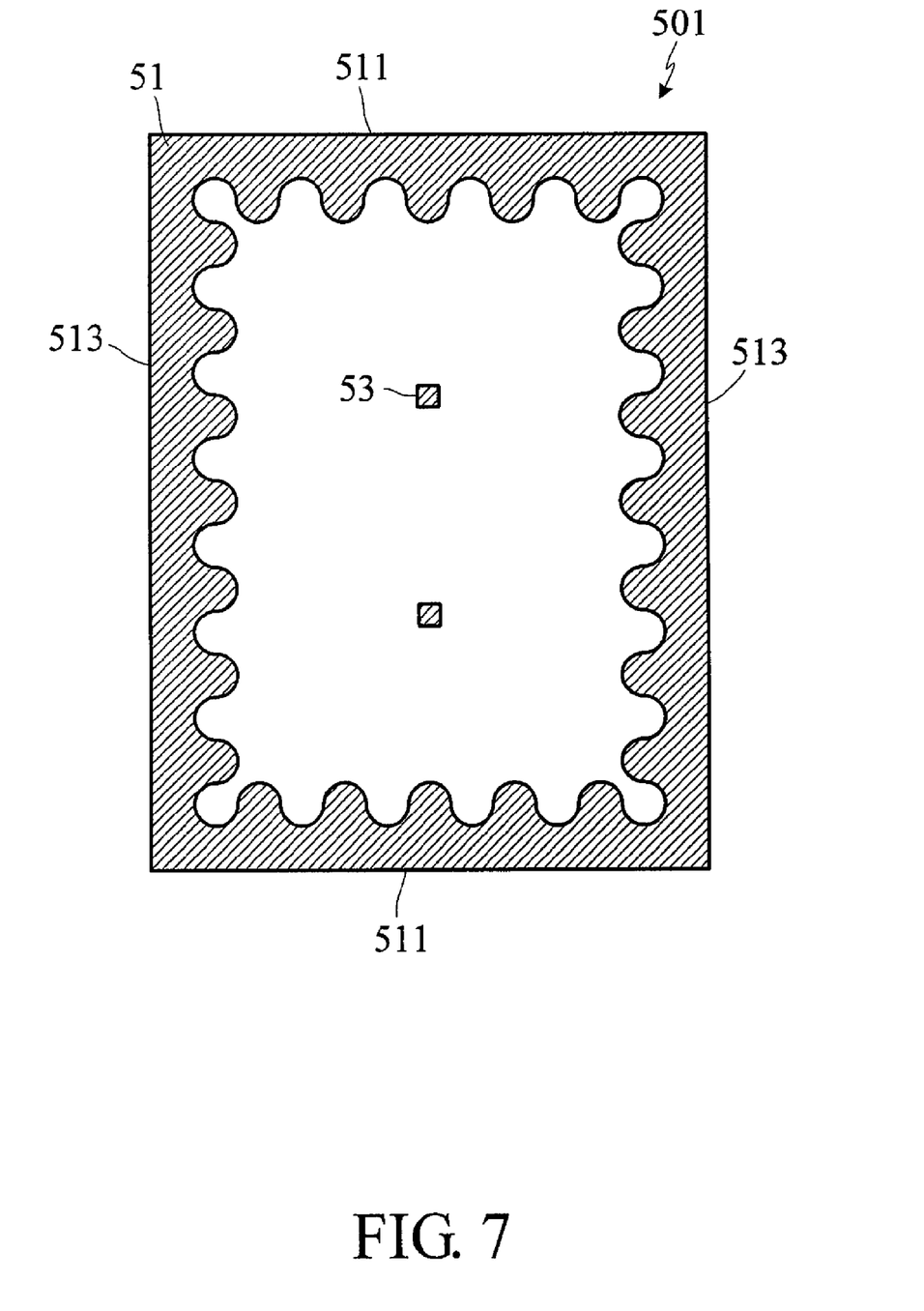
FIG. 7 is a schematic view illustrating still another embodiment as shown in FIG. 5.

FIG. 7 shows yet a further preferred embodiment of the present invention, in which the inner surfaces of the black matrix units 501 have a particular shape. More specifically, the inner surfaces of the first side walls 511 and the second side walls 513 are patterned as a continuous wavy contour, e.g., a plurality of concave portions and a plurality of convex portions that are alternately formed as shown in FIG. 7.

It should be noted that the spacers 53 disclosed in the present invention are not limited to the above-mentioned pattern arrangement. As long as the receiving space is divided (preferably divided evenly), the overall surface height of the color filter layer 33 will be decreased. In addition, in the embodiments described above, by the use of plasma hydrophobic treatment on black matrix and plasma hydrophilic treatment on the substrate, the top and inner surfaces of the first side-walls 511 and the second side-walls 513 are hydrophobic for preventing from overflowing, and meanwhile the upper surface of the substrate 31 is hydrophilic for filling the ink 41 in the receiving space.

The spacers 53 of the present invention may decrease the aperture ratio defined as the ratio of the aperture area to the total pixel area. However, the actual measurement reveals that the decrease of aperture ratio is approximately less than 2%. Therefore, even with a slight decrease of aperture ratio, the design of the present invention can effectively improve the overall display effect of the color filter.

According to the above disclosures, the spacers disposed in the receiving space of the black matrix unit can ease the ink jetting into the receiving space during the formation of the color filter layer from overflowing. Further, when the color filter layer is formed in the receiving space, surface tension can also be restrained and thus, improve the overall flatness of the color filter layer and make the color display of the pixels more uniform.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A color filter, at least comprising:
   a substrate including a plurality of pixel areas defined thereon;
   at least one frame being disposed in correspondence to one of the pixel areas on the substrate to define a receiving space with the substrate;
   at least one spacer being disposed in the receiving space; and
   a color filter layer being disposed in the receiving space.

2. The color filter as claimed in claim 1, wherein the frame includes two parallel first side-walls and two parallel second side-walls being adapted to define the receiving space.

3. The color filter as claimed in claim 2, wherein the at least one spacer comprises a plurality of spacers.

4. The color filter as claimed in claim 3, wherein the plurality of spacers are equidistantly arranged corresponding to a symmetric center of the pixel.

5. The color filter as claimed in claim 4, wherein the plurality of spacers are at least partially arranged in a first linearity with a first distance corresponding to the two parallel first side-walls.

6. The color filter as claimed in claim 4, wherein the plurality of spacers are at least partially arranged in a second linearity with a second distance corresponding to the two parallel second side-walls.

7. The color filter as claimed in claim 4, wherein the plurality of spacers are at least partially arranged in a first linearity with a first distance corresponding to the two parallel first side-walls, and at least partially arranged in a second linearity with a second distance corresponding to the two parallel second side-walls.

8. The color filter as claimed in claim 7, wherein the first distance and the second distance are substantially equal.

9. The color filter as claimed in claim 4, wherein the plurality of spacers comprises columns.

10. The color filter as claimed in claim 9, wherein each of the columns has a cross-section selected from a group comprising a square, a circle, a triangle, a polygon and a combination thereof.

11. The color filter as claimed in claim 1, wherein the top surface height of at least one spacer is substantially equivalent to the top surface height of the frame.

12. The color filter as claimed in claim 2, wherein the inner surfaces of the first and second side-walls are with a wavy contour in continuous.

13. The color filter as claimed in claim 12, wherein the wavy contour comprises a plurality of concave portions and a plurality of convex portions being formed alternately.

14. The color filter as claimed in claim 2, wherein the top and inner surfaces of the first and second side-walls are hydrophobic.

15. The color filter as claimed in claim 1, wherein the substrate has an upper surface which is hydrophilic.

16. The color filter as claimed in claim 1, wherein the color filter layer is selected from a group comprising red ink, blue ink and green ink and a combination thereof.

17. The color filter as claimed in claim 1, further comprising a black matrix being adapted to define the at least one frame.

18. A black matrix for a color filter, the color filter having a substrate including a plurality of pixel areas defined thereon, the black matrix comprising:
a plurality of black matrix units, being disposed on the substrate and corresponding to the plurality of pixel areas respectively, wherein each of the black matrix units comprises:
a frame, defining a receiving space with the substrate for filling a color filter layer; and
at least one spacer being disposed in the receiving space defined by the frame.

19. The black matrix as claimed in claim 18, wherein the frame includes two parallel first side-walls and two parallel second side-walls being adapted to define the receiving space.

20. The black matrix as claimed in claim 19, wherein each of the plurality of black matrix units comprises a plurality of spacers.

21. The black matrix as claimed in claim 20, wherein the plurality of spacers are equidistantly arranged corresponding to a symmetric center.

22. The black matrix as claimed in claim 21, wherein the plurality of spacers are at least partially arranged in a first linearity with a first distance corresponding to the two parallel first side-walls, and at least partially arranged in a second linearity with a second distance corresponding to the two parallel second side-walls.

\* \* \* \* \*